United States Patent

Fujii et al.

[11] Patent Number: 5,204,406
[45] Date of Patent: Apr. 20, 1993

[54] IMPACT-RESISTANT THERMOPLASTIC RESIN COMPOSITION

[75] Inventors: Seizo Fujii; Yutaka Toyooka, both of Otake, Japan

[73] Assignee: Mitsubishi Rayon Company, Ltd., Tokyo, Japan

[21] Appl. No.: 553,026

[22] Filed: Jul. 3, 1990

[30] Foreign Application Priority Data

Jul. 3, 1989 [JP] Japan ................... 1-169832

[51] Int. Cl.$^5$ ............. C08L 25/12; C08L 33/48; C08L 33/20; C08L 33/24
[52] U.S. Cl. .......................... 525/73; 525/77; 525/78; 525/85; 525/205; 525/238; 525/241
[58] Field of Search ............. 525/73, 77, 78, 85, 525/205, 238, 241, 73

[56] References Cited

U.S. PATENT DOCUMENTS 4,556,692 12/1985 Kishida et al. ............... 525/78

FOREIGN PATENT DOCUMENTS

| 0077038 | 4/1983 | European Pat. Off. . |
| 0144081 | 6/1985 | European Pat. Off. . |
| 0160285 | 11/1985 | European Pat. Off. . |
| 2189441 | 1/1974 | France . |
| 61-179252 | 8/1986 | Japan ................... 525/73 |
| 61-233040 | 10/1986 | Japan ................... 525/73 |

OTHER PUBLICATIONS

Translation of forestated Japan 61-179252.
Translation of forestated Japan 61-233040.

*Primary Examiner*—James J. Seidleck
*Assistant Examiner*—W. R. H. Clark
*Attorney, Agent, or Firm*—Nikaido, Marmelstein, Murray & Oram

[57] ABSTRACT

Disclosed is an impact-resistant thermoplastic resin composition comprising (a) a graft copolymer (II) prepared by polymerizing a monomer or monomer mixture predominantly comprised of methyl methacrylate and/or styrene in the presence of an agglomerated rubber copolymer (I') latex, and (b) bent-resistant rigid thermoplastic resin (III) comprised of α-methylstyrene or a maleimide compound. The agglomerated rubber copolymer (I') is prepared by emulsion-polymerizing an alkyl acrylate/1,3-butadiene mixture, and then agglomerating the resulting rubbery copolymer. The agglomeration is effected by adding (a) an acid group-containing copolymer prepared by emulsion polymerizing an alkyl methacrylate/unsaturated monomer mixture, and/or (b) an oxy acid salt selected from alkali metal, alkaline earth metal, zinc, nickel and aluminum salts of oxy acids having as the center element an element selected from elements belonging to the second and third periods of groups IIIA through VIA of the Periodic Table.

7 Claims, No Drawings

IMPACT-RESISTANT THERMOPLASTIC RESIN COMPOSITION

BACKGROUND OF THE INVENTION

(1) Field of the Invention

The present invention relates to a weather-resistant and heat-resistant thermoplastic resin composition having a high impact resistance.

(2) Description of the Related Art

Recently, a thermoplastic resin used for interior automotive trims such as an instrument panel and a defroster grill and a pillar is required to have impact resistance, heat resistance, and weather resistance.

An impact-resistant thermoplastic resin such as an ABS resin or HIPS resin is generally obtained by graft-polymerizing a monomer such as styrene, acrylonitrile or methyl methacrylate to a rubber component. The physical properties of the obtained composition are greatly influenced by the composition and structure of the graft copolymer, the rubber component and the polymerization process. Especially when the graft polymerization to the rubber component is effected by the emulsion polymerization process, as is well-known, the particle size of the rubber component as the substrate is dominant with regard to the impact resistance and workability of the obtained resin composition. In general, an increase of the particle size of the rubber results in improvements of the impact resistance and workability.

Accordingly, attempts have been made to increase the particle size of the rubber as much as possible, and various processes have been proposed. For example, a resin composition having a high impact resistance, obtained by polymerizing a monomer mixture comprised of at least one monomer selected from styrene, acrylonitrile and methyl methacrylate and a vinyl monomer copolymerizable therewith in the presence of a latex of a large-particle-size rubber obtained by agglomerating a diene type rubber with a latex of a copolymer comprising an unsaturated acid monomer and an alkyl acrylate, has been proposed (see Japanese Unexamined Patent Publication No. 58-63713).

Nevertheless, when a rubber component having butadiene as the main constituent is used, the obtained composition has a very good initial impact resistance but a poor weatherability. Moreover, the resin composition has a poor heat-resistant stability. Furthermore, when a styrene/butadiene copolymer is used as the rubber component, since the rubbery characteristics are degraded by the styrene units which have a high glass transition temperature, the obtained resin composition has a poor impact resistance in the low temperature region.

SUMMARY OF THE INVENTION

Investigations were made with a view to providing a heat-resistant thermoplastic resin composition having a high impact resistance, reduced heat discoloration, and good weatherability, and as a result, it was found that, if a rubber copolymer latex comprising a minor amount of butadiene and a major amount of a specific alkyl acrylate as main constituents is agglomerated to have a particle size suitable for the manifestation of a high impact resistance by adding a latex of an acid group-containing copolymer having a specific structure and/or an oxy acid salt having a specific structure and a graft copolymer obtained by graft-copolymerizing monomers to the agglomerated rubber copolymer latex is mixed with a heat-resistant rigid thermoplastic resin at a specific ratio, a resin composition attaining the above object can be obtained by the synergistic effect of both components.

In accordance with the present invention, there is provided an impact-resistant thermoplastic resin composition comprising (a) a graft copolymer (II) prepared by polymerizing 10 to 1,000 parts by weight of a monomer or monomer mixture composed of 50 to 100% by weight a monomer selected from the group consisting of methyl methacrylate and styrene and 50 to 0% by weight of a monofunctional or polyfunctional monomer copolymerizable therewith in the presence of 100 parts by weight (as solids) of a latex of an agglomerated rubber copolymer (I'), and (b) a heat-resistant rigid thermoplastic resin (III) comprising units derived from at least one compound selected from α-methylstyrene and a maleimide compound; the proportion of the graft copolymer (II) to the rigid thermoplastic resin (III) being such that the amount of the agglomerated rubber copolymer (I') is 1 to 70% by weight based on the total weight of the impact-resistant thermoplastic resin composition;

said agglomerated rubber copolymer (I') being prepared by the steps of:

emulsion-polymerizing a monomer mixture comprised of 51 to 99% by weight of an alkyl acrylate having 2 to 8 carbon atoms in the alkyl group, 49 to 1% by weight of 1,3-butadiene and 10 to 0% by weight of at least one copolymerizable monomer selected from monofunctional monomers and polyfunctional monomers, to prepare a latex of a rubbery copolymer (I), and agglomerating the rubbery copolymer (I) to an extent such that the average particle diameter of the agglomerated rubbery copolymer is 0.12 to 0.4 μm, by adding 0.1 to 5 parts by weight of an agglomerating agent to 100 parts by weight as the polymer of the latex of the rubbery copolymer (I); said agglomerating agent being selected from the group consisting of (A) an acid group-containing copolymer in a polymer latex formed by emulsion-polymerizing a monomer mixture comprised of 3 to 40% by weight of at least one unsaturated acid selected from the group consisting of acrylic acid, methacrylic acid, itaconic acid, crotonic acid, maleic acid, fumaric acid, cinnamic acid, sorbic acid and p-styrenesulfonic acid, 97 to 35% by weight of at least one alkyl acrylate having 1 to 12 carbon atoms in the alkyl group and 0 to 40% by weight of other monomer copolymerizable therewith and (B) at least one oxy acid salt selected from the group consisting of alkali metal, alkaline earth metal, zinc, nickel and aluminum salts of oxy acids having as the center element at least one element selected from the group consisting of elements belonging to the second and third periods of groups IIIA through VIA of the Periodic Table.

DESCRIPTION OF THE PREFERRED EMBODIMENTS

The rubbery copolymer (I) used in the present invention comprises units derived from 51 to 99% by weight, preferably 51 to 65% by weight, of an alkyl acrylate having 2 to 8 carbon atoms in the alkyl group, 49 to 1% by weight, preferably 49 to 35% by weight, of 1,3-butadiene, and 10 to 0% by weight, preferably 5 to 0% by weight, of other copolymerizable monomer.

By using a major amount of an alkyl acrylate having a good weatherability and a minor amount, not degrading the weatherability, of 1,3-butadiene having good rubbery characteristics, a composition having a high impact resistance and weatherability can be obtained. If the composition ratio is outside the above-mentioned range, the impact resistance or weatherability is relatively poor. Butyl acrylate and 2-ethylhexyl acrylate are preferably used as the alkyl acrylate.

As the other copolymerizable monomer, there can be mentioned monofunctional monomers such as acrylonitrile and alkyl methacrylates, e.g., methyl methacrylate, and polyfunctional monomers such as divinylbenzene, ethylene glycol diacrylate, butylene glycol diacrylate, triallyl cyanurate, triallyl isocyanurate, trimethylolpropane triacrylate and pentaerythritol tetraacrylate.

The rubbery copolymer (I) can be obtained according to a known emulsion polymerization process, and a chain transfer agent such as a mercaptan compound or a polyfunctional monomer can be used for the polymerization. Preferably, the particle diameter of the obtained rubber copolymer (II) latex is 0.03 to 0.20 μm, especially 0.05 to 0.15 μm. Outside this range, control of the polymerization speed or the polymerization temperature becomes difficult, a desired particle size cannot be obtained at the subsequent agglomerating step, the polymerization system becomes unstable, and the impact resistance or appearance of the final composition is poor.

The acid group-containing copolymer (A) added as an agglomerating agent to the rubbery copolymer (I) latex comprises units derived from a monomer mixture comprised of 3 to 40% by weight of at least one unsaturated acid monomer selected from the group consisting of acrylic acid, methacrylic acid, itaconic acid, crotonic acid, maleic acid, fumaric acid, cinnamic acid, sorbic acid and p-styrenesulfonic acid, 97 to 35% by weight of at least alkyl acrylate having 1 to 12 carbon atoms in the alkyl group and 0 to 40% by weight of other copolymerizable monomer is used for agglomerating the rubbery copolymer (I) latex. As the other copolymerizable monomer, there can be mentioned alkyl methacrylates such as methyl methacrylate, styrene derivatives such as α-methylstyrene, and acrylonitrile.

The unsaturated acid monomer is used in an amount of 3 to 40% by weight. If the amount of the unsaturated acid is smaller than 3% by weight, the agglomerating capacity is low and if the amount of the unsaturated acid exceeds 40% by weight, the agglomerating effect becomes too high and extremely large particles having a particle diameter larger than 1 μm are undesirably formed.

The optimum content of the unsaturated acid monomer depends on the hydrophilic degree of the used alkyl acrylate. If the hydrophilic degree of the alkyl acrylate is high, the agglomerating effect is obtained in the region where the amount of the unsaturated acid monomer is small, but if the amount of the unsaturated acid monomer is increased in this case, the latex state is undesirably destroyed. In contrast, when the hydrophilic degree of the alkyl acrylate is low, the intended effect is not obtained unless the amount of the unsaturated acid monomer is increased to some extent. For example, in the case of an alkyl acrylate having a high hydrophilic degree, such as methyl acrylate or ethyl acrylate, an optimum amount of the unsaturated acid monomer is 5 to 10% by weight. On the other hand, in the case of a hydrophobic alkyl acrylate having at least 4 carbon atoms, such as butyl acrylate or 2-ethylhexyl acrylate, an optimum amount of the unsaturated acid monomer is 13 to 20% by weight.

The acid group-containing copolymer (A) latex used in the present invention can be obtained by polymerizing the monomer mixture having the above composition in a batchwise manner wherein the monomer mixture is charged collectively or in a continuous manner wherein the monomer mixture is continuously charged.

Alternatively, a latex having a multi-layer structure including at least two layers can be prepared as the acid group-containing copolymer (A) latex, according to the polymerization of two or more stages where a portion corresponding 5 to 90% by weight of the monomer mixture, which does not contain the unsaturated acid monomer, is first polymerized, and subsequently, the remaining 95 to 10% by weight of the monomer mixture is polymerized without a formation of new particles.

Also at least one oxy acid salt (B) selected from the group consisting of alkali metal, alkaline earth metal, zinc, nickel and aluminum salts of oxy acids having as the center element an element selected from the group consisting of elements belonging to the second and third periods of groups IIIA through VIA of the Periodic Table is used as an agglomerating agent for agglomerating the rubbery copolymer (I) latex. As the oxy acid salt, there can be mentioned salts of sulfuric acid, nitric acid and phosphoric acid with potassium, sodium, magnesium, calcium, nickel and aluminum. Potassium sulfate, sodium sulfate, magnesium sulfate, aluminum sulfate, sodium phosphate and magnesium phosphate are preferably used.

The acid group-containing copolymer (A) and the oxy acid salt (B) can be used either alone or in combination.

If these components are used alone, the amount of the added acid group-containing copolymer (A) latex as the polymer solid is 0.1 to 5 parts by weight, preferably 0.5 to 5 parts by weight, per 100 parts by weight of the substrate rubbery copolymer (I), or the amount of the added oxy acid salt (B) is 0.1 to 5 parts by weight, preferably 0.1 to 4 parts by weight, per 100 parts by weight of the substrate rubbery copolymer (I). If these components are added in appropriate amounts, the agglomeration of the rubbery copolymer (I) latex can be accomplished efficiently, and the stability of the obtained rubber latex having a large particle size is greatly improved.

If the agglomerating treatment of the present invention using the acid group-containing copolymer (A) is carried out, the pH value of the substrate rubbery copolymer (I) latex is preferably at least 7. If the pH value is on the acidic side, even by addition of the acid group-containing copolymer (A) latex, the agglomeration efficiency is low, and sometimes the intended composition of the present invention cannot be prepared.

The intended impact-resistant resin [i.e., the graft copolymer (II)] to be incorporated with the heat-resistant rigid thermoplastic resin (III) can be obtained by polymerizing 10 to 1,000 parts by weight of a monomer or monomer mixture containing at least 50% by weight of styrene and/or methyl methacrylate in the presence of 100 parts by weight of the thus agglomerated rubber latex (I'). If the amount of the agglomerated rubber latex is too small, the impact resistance is reduced, and if the amount of the agglomerated rubber latex (I') is too large, the flowability and workability are poor.

As the monomer to be grafted onto the rubber latex, there can be mentioned styrene alone, methyl methacrylate alone, a styrene/acrylonitrile monomer mixture, a styrene/acrylic acid ester monomer mixture, a methyl methacrylate/acrylonitrile monomer mixture, and a methyl methacrylate/acrylic acid ester monomer mixture. Furthermore, a monomer mixture comprising at least three monomers as mentioned above can be used.

Also there can be adopted a polymerization process of at least two stages in which a known polyfunctional monomer such as divinylbenzene or 1,4-butanediol diacrylate is added to a monomer or monomer mixture composed mainly of methyl methacrylate and/or styrene, the polyfunctional monomer-containing mixture is first graft-polymerized, and a monomer or monomer mixture free of the polyfunctional monomer is then graft-polymerized.

A usual emulsifier such as a sarcosine derivative, a succinic acid derivative, a rosin acid derivative, an alkali metal salt or alkyl sulfate of a fatty acid, or an alkylbenzenesulfonic acid salt can be used. Of these, sodium N-laurylsarcosinate is preferable. As the polymerization initiator, there can be used heat decomposition type initiators such as potassium persulfate and ammonium persulfate, and redox type initiators comprising combinations of organic peroxides such as cumene hydroperoxide, tertiary butylhydroperoxide and diisopropylbenzene hydroperoxide, with an iron compound, sodium pyrophosphate and sodium formaldehyde-sulfoxylate. Sodium ethylenediaminetetraacetate can be used instead of sodium pyrophosphate and dextrose can be used instead of sodium formaldehyde-sulfoxylate.

The obtained graft copolymer (II) latex is coagulated according to a known method, for example, by throwing in an aqueous solution of sulfuric acid, and the copolymer (II) is obtained in the form of a white powder through dehydration, washing and drying.

As the heat-resistant rigid thermoplastic resin (III), a copolymer derived from 60 to 90% by weight of α-methylstyrene or 5 to 40% by weight of a maleimide compound, and the balance of at least one copolymerizable monoethylenically unsaturated monomer such as acrylonitrile, styrene or methyl methacrylate is preferably used.

A copolymer derived from 10 to 40% by weight of acrylonitrile, 90 to 60% by weight of α-methylstyrene and 30 to 0% by weight of other copolymerizable monomer and a copolymer derived from 5 to 40% by weight of a maleimide compound, 10 to 40% by weight of acrylonitrile, 85 to 30% weight of styrene and/or α-methylstyrene and 30 to 0% by weight of other copolymerizable monomer are more preferably used. Both copolymers can be used in combination, or parts of these copolymers can be replaced by a polycarbonate resin, or other thermoplastic resin such as an AS resin or PMMA resin in an amount not causing substantial reduction of the heat resistance. In general, the emulsion polymerization process is adopted for the preparation of these copolymers, but the suspension polymerization process and the bulk polymerization process can be adopted.

As the other copolymerizable monomer, there can be mentioned unsaturated carboxylic acids, alkyl esters thereof, styrene derivatives other than α-methylstyrene, vinyl cyanide compounds other than acrylonitrile, and vinyl acetate. As the maleimide compound, there can be mentioned maleimide and N-substituted maleimides. As the N-substituent, there can be mentioned an alkyl group having 1 to 12 carbon atoms and a phenyl group. This phenyl group can be substituted with an alkyl group having 1 to 6 carbon atoms, a halogen atom, an alkoxy group having 1 to 4 carbon atoms, a phenyl group, a carboxyl group, a nitro group, an amino group and/or a cyano group. N-phenylmaleimide, N-cyclohexylmaleimide, N-2-methylphenylmaleimide, and N-2-chlorophenylmaleimide are especially preferably used.

The graft copolymer (II) and the rigid thermoplastic resin (III) are mixed together in a proportion such that the proportion of the agglomerated rubbery copolymer (I') in the composition is 1 to 70% by weight, preferably 5 to 40% by weight, and thus, a heat-resistant thermoplastic resin composition having a high impact resistance and a good weatherability can be obtained.

If the proportion of the agglomerated rubbery copolymer (I') is smaller than 1% by weight, the impact resistance is degraded, and if the proportion of the copolymer (I') exceeds 70% by weight, the heat distortion temperature is lowered.

A V-type blender, a Henschel mixer and the like can be used for incorporating the graft copolymer (II) with the rigid thermoplastic resin (III). A stabilizer, a lubricant, a plasticizer, a dye, a pigment and a filler can be added according to need. For example, if a benzotriazole type or benzophenone type ultraviolet absorber and a hindered amine type weather-resistant stabilizer are incorporated, the weatherability is further improved, and if a hindered phenol type or phosphite type antioxidant is added, the heat discoloration is controlled. Furthermore, if a metal soap or silicone oil is added, the mold release property can be improved.

The above-mentioned composition is melt-kneaded at 200° to 350° C. by using a mixing roll or a screw type extruder and is then pelletized by a pelletizer.

The thermoplastic resin composition of the present invention has a high impact resistance, weatherability, and heat resistance, and can be utilized in various fields where all of the impact resistance, weatherability, and heat resistance are required, for example, for the production of interior automotive trims.

The invention will be described by the following examples, wherein all of "parts" and "%" are by weight unless otherwise indicated. The properties of samples were evaluated according to the following processes.

(1) Izod Impact Strength

The Izod impact strength was measured according to ASTM D-256 (unit: kg.cm/cm).

(2) Melt Flow Index (MI)

The melt flow index was measured according to ASTM D-1238 at a temperature of 220° C. and a load of 10 kg by using a melt indexer supplied by Toyo Bauldwin Co.

(3) Rockwell Hardness (R)

The Rockwell hardness was measured according to ASTM D-785 (R scale).

(4) Vicat Softening Temperature (VST)

The Vicat softening temperature was measured under a load of 5 kg according to ISO R-306 (unit: ° C.).

(5) Particle Diameter of Latex

The particle diameter of the latex was measured by observing an electron microscope photograph of the freeze-dried latex.

(6) Accelerated Exposure Test

The sample was exposed for 200 hours at 83° C. under a raining condition by using a sunshine super-long life weatherometer, Model WEL-SUN-DCH supplied by Suga Shikenki.

EXAMPLES 1 THROUGH 9 AND COMPARATIVE EXAMPLES 1 THROUGH 3

Preparation of Rubbery Copolymer (I)

Oxygen contained in components shown in Table 1, except 1,3-butadiene, was replaced by nitrogen, so that the polymerization was not substantially inhibited. Then, all of the components were charged in an autoclave, and polymerization was carried out at 50° C. for 9 hours. In each run, the conversion of the monomers was about 97%, and a rubber latex having a particle diameter of 0.07 to 0.08 μm was obtained.

TABLE 1

| Composition (parts) | I-a | I-b | I-c | I-d |
|---|---|---|---|---|
| Butyl acrylate | 60 | 55 | — | 100 |
| 1,3-Butadiene | 40 | 45 | 100 | — |
| 1,3-Butylene dimethacrylate | — | — | — | 0.5 |
| Diisopropylbenzene hydroperoxide | | | 0.2 | |
| Potassium beef-tallow fatty acid | | | 1 | |
| Sodium N-lauroylsarcosinate | | | 0.5 | |
| Sodium pyrophosphate | | | 0.5 | |
| Ferrous sulfate | | | 0.005 | |
| Dextrose | | | 0.3 | |
| Deionized water | | | 200 | |
| Rubber particle diameter (μm) | 0.07 | 0.07 | 0.08 | 0.07 |

Preparation of Acid Group-Containing Copolymer Latex (A) for Agglomerating Particles of Rubbery Copolymer (1) Latex A mixture comprising a monomer composition of the first stage shown in Table 2, 2 parts of potassium oleate, 1 part of sodium dioctyl sulfosuccinate, 0.1 part of cumene hydroperoxide, 0.3 part of sodium formaldehydesulfoxylate and 200 parts of deionized water was charged in a glass round-bottom flask, and polymerization was carried out at 70° C. for 1.5 hours. Subsequently, a mixture comprising a monomer composition of the second stage shown in Table 2 and 0.3 part of cumene hydroperoxide was added dropwise over a period of 1 hour to effect polymerization. Then, stirring was continued for 1 hour to obtain a copolymer latex (A) in which the conversion was at least 97%.

TABLE 2

| Monomer composition (parts) | A-1 | A-2 | A-3 | A-4 | A-5 | A-6 |
|---|---|---|---|---|---|---|
| First stage | | | | | | |
| Butyl acrylate | 25 | 85 | 25 | 25 | 25 | — |
| Methacrylic acid | — | 15 | — | — | — | 15 |
| Methyl methacrylate | — | — | — | — | — | 85 |
| Second stage | | | | | | |
| Butyl acrylate | 60 | — | 60 | 50 | 75 | — |
| Methacrylic acid | 15 | — | — | 25 | — | — |
| Acrylic acid | — | — | 15 | — | — | — |

Preparation of Agglomerated Rubbery Polymer (I')

In an autoclave, a latex of a rubbery copolymer (I) latex containing 100 parts of a polymer solid was stirred at 50° C., and (a) a 10% aqueous solution of sodium sulfate was added in an amount shown in Table 3 and the mixture was maintained for 15 minutes, or (b) an acid group-containing copolymer (A) latex was added in an amount shown in Table 3 and the mixture was maintained for 30 minutes. Alternately, (c) a 10% aqueous solution of sodium sulfate, was added in an amount shown in Table 3, the mixture was maintained for 15 minutes, an acid group-containing polymer (A) latex was then added in an amount shown in Table 3, and the mixture was maintained for 30 minutes. Thus, an agglomerated rubbery copolymer (I') was obtained.

Preparation of Graft Copolymer (II)

Into a reaction vessel charged with the agglomerated latex containing 100 parts of the solids of the agglomerated rubber copolymer were added 90 parts of deionized water, 0.2 part of sodium formaldehydesulfoxylate and 0.5 part of sodium N-lauroylsarcosinate, the inner temperature was elevated to 75° C., and a mixture comprising 45 parts of methyl methacrylate, 5 parts of ethyl acrylate, 0.07 part of N-octylmercaptan and 0.16 part of cumene hydroperoxide was continuously added dropwise over a period of 1.5 hours to effect polymerization. Then, stirring was continued for 1 hour, whereby the conversion of methyl methacrylate reached almost 100%. The obtained latex was placed into a 0.25% aqueous solution of sulfuric acid (latex/aqueous solution = ½), and the mixture was heated at 85° C. for 5 minutes to coagulate the latex. The coagulated latex was washed, dehydrated and dried at 70° C. for 24 hours to obtain a graft copolymer (II) in the form of a white powder.

TABLE 3

| Graft copolymer [II] | Rubbery copolymer [I], 100 parts | Agglomerating conditions ||||| State of graft polymerization |
|---|---|---|---|---|---|---|---|
| | | Agglomerating agent ||| Latex particle diameter (μm) || |
| | | Acid group-containing copolymer (A), (parts) || Sodium sulfate (parts) | [I] | [I'] | |
| II-1 | I-a | A-1 | 0.5 | 1.5 | 0.07 | 0.15 | Good |
| II-2 | I-b | " | | 1.5 | 0.07 | 0.14 | " |
| II-3 | I-c | " | | 1.5 | 0.08 | 0.16 | " |
| II-4 | I-d | " | | 1.5 | 0.07 | 0.16 | " |
| II-5 | I-a | A-2 | 2 | — | 0.07 | 0.26 | " |
| II-6 | " | A-3 | 0.5 | 0.3 | 0.07 | 0.32 | " |
| II-7 | " | A-4 | 1 | — | 0.07 | 0.29 | " |
| II-8 | " | — | | 0.7 | 0.07 | 0.12 | " |
| II-9 | " | — | | — | 0.07 | 0.07 | " |
| II-10 | " | A-5 | 0.5 | — | 0.07 | 0.08 | " |
| II-11 | " | A-6 | 0.5 | — | 0.07 | 0.07 | " |
| Comparative | " | A-1 | 4 | 1.5 | 0.07 | 0.61 | " |

TABLE 3-continued

| | | Agglomerating conditions | | | | |
|---|---|---|---|---|---|---|
| | | Agglomerating agent | | | | |
| Graft copolymer [II] | Rubbery copolymer [I], 100 parts | Acid group-containing copolymer (A), (parts) | Sodium sulfate (parts) | Latex particle diameter (μm) [I] | [I'] | State of graft polymerization |
| Example 1 | | | | | | |

Note:
Aggregation occurred in the latex during polymerization

Preparation of Rigid Thermoplastic Resin (III-a)

A glass separable flask was charged with a mixture comprising 3 parts of potassium oleate, 0.5 part of dextrose, 0.5 part of sodium pyrophosphate, 0.005 part of ferrous sulfate and 200 parts of deionized water, the temperature was elevated to 60° C. and a mixture comprising 25 parts of acrylonitrile, 75 parts of α-methylstyrene, 0.1 part of tertiary dodecylmercaptan and 0.5 part of cumene hydroperoxide was continuously added dropwise over a period of 2.5 hours to effect polymerization. Then, stirring was conducted for 2 hours to obtain a copolymer latex having a monomer conversion of 95%, the copolymer latex was placed into a 5% aqueous solution of magnesium sulfate (the same amount as that of the latex), and the mixture was heated at 100° C. for 30 minutes to coagulate the latex. Washing, dehydration, and drying gave a copolymer in the form of a white powder.

Preparation of Rigid Thermoplastic Resin (III-b)

A glass separable flask was charged with a mixture comprising 2 parts of sodium dodecylbenzenesulfonate, 0.5 part of sodium formaldehydesulfoxylate, 0.05 part of disodium ethylenediaminetetraacetate, 0.005 part of ferrous sulfate and 250 parts of deionized water, the temperature was elevated to 50° C., and a mixture comprising 20 parts by acrylonitrile, 60 parts of styrene, 20 parts of N-phenylmaleimide, 0.1 part of tertiary dodecylmercaptan and 0.3 part of cumene hydroperoxide was added dropwise over a period of 2.5 hours to effect polymerization. Then, stirring was continued for 1 hour to obtain a copolymer latex having a monomer conversion of 97%. The copolymer latex was placed into a 5% aqueous solution of magnesium sulfate (the same amount as that of the latex), and the mixture was heated at 100° C. for 30 minutes to coagulate the latex. Washing, dehydration, and drying gave a copolymer in the form of a white powder.

Preparation of Rigid Thermoplastic Resin (III-c)

A glass separable flask was charged with a mixture comprising 2 parts of potassium oleate, 0.4 part of dextrose, 0.3 part of sodium pyrophosphate, 0.005 part of ferrous sulfate and 170 parts of deionized water, the temperature was elevated to 55° C., and a mixture comprising 25 parts of acrylonitrile, 75 parts of styrene, 0.2 part of tertiary dodecylmercaptan and 0.3 part of cumene hydroperoxide was continuously added dropwise over a period of 1.5 hours to effect polymerization. Then, stirring was conducted for 30 minutes to obtain a copolymer latex having a monomer conversion of 97%. The copolymer latex was placed into a 1.5% aqueous solution of magnesium sulfate (the amount was 2 times as large as the amount of the latex), and the mixture was heated at 90° C. for 15 minutes to coagulate the latex. Washing, dehydration and drying gave a copolymer in the form of a white powder.

Preparation of Resin Composition

The graft copolymer (II) was blended with the rigid thermoplastic resin (III) at a ratio shown in Tables 4 through 6, and 0.2 part of an antioxidant (Mark AO-20 supplied by Adeka Argus Chemical Co.), 0.2 part of an antioxidant (Mark PEP24 supplied by Adeka Argus Chemical Co.), 0.2 part of a light-resistant stabilizer (Tinuvin-P supplied by Ciba-Geigy), 0.3 part of a light-resistant stabilizer (Sanol LS770 supplied by Sankyo Co.) and 0.5 part of a metal soap were added to the blend, and the composition was mixed by a Henschel mixer and pelletized at 260° C. and 300 rpm by using a screw type extruder (PCM-30 supplied by Ikegai Tekkosho). The pellet was molded into a test piece by an injection molding machine (SAV-30A supplied by Yamashiro Seiki). The properties were evaluated by using the so-prepared test pieces, and the results are shown in Tables 4 through 6.

From the results of Examples 1 and 2 and Comparative Examples 2 and 3 shown in Table 4, it is seen that, with respect to the composition of the rubbery copolymer (I), the composition obtained according to the present invention had a high impact resistance at low temperatures and a good weatherability, but if the amount of 1,3-butadiene was large, the weatherability was poor, and if the amount of butyl acrylate was large, the impact resistance at low temperatures was low.

From the results of Examples 3 through 6 and Comparative Examples 4 through 6 shown in Table 5, it is seen that if the agglomeration operation was carried out according to the present invention, an agglomeration of the particles of the latex occurred and the impact resistance was improved, but if the agglomeration operation was carried out by using the acid group-containing copolymer latex (A) outside the scope of the present invention, agglomeration did not occur and the impact resistance was poor. If the agglomeration operation was not carried out, the impact resistance was similarly poor.

From the results of Examples 7 through 9 shown in Table 6, it is seen that the graft copolymer (II) prepared according to the present invention gave a high heat resistance, impact resistance, and weatherability to a resin composition comprising this graft copolymer (II) and a maleimide type heat-resistant thermoplastic resin, even if a small amount of an AS resin was used in combination.

TABLE 4

| | Graft Copolymer [II] | | Amount of rigid thermoplastic resin [III-a] (parts) | Izod impact strength (kg · cm/cm) | | | MI (g) | R | VST (°C.) |
|---|---|---|---|---|---|---|---|---|---|
| | Kind and amount (parts) | Composition of rubbery copolymer (I)* | | At 23° C. | At −30° C. | After accelerated exposure at 23° C. | | | |
| Example 1 | II-1 (25) | 60/40 | 75 | 10 | 3 | 7 | 1.6 | 110 | 125 |
| Example 2 | II-2 (25) | 55/45 | 75 | 11 | 4 | 8 | 1.8 | 109 | 124 |
| Comparative Example 2 | II-3 (25) | 0/100 | 75 | 12 | 6 | 4 | 2.2 | 108 | 125 |
| Comparative Example 3 | II-4 (25) | 100/0 | 75 | 9 | 1 | 8 | 1.4 | 109 | 127 |

Note*:
butyl acrylate/1,3-butadiene weight ratio

TABLE 5

| | Graft copolymer [II] | | Amount of rigid thermoplastic resin [III-a] (parts) | Izod impact strength (kg · cm/cm) | MI (g) | R | VST (°C.) |
|---|---|---|---|---|---|---|---|
| | Kind and amount (parts) | Particle diameter of agglomerated rubbery copolymer (I') (μm) | | | | | |
| Example 3 | II-5 (25) | 0.26 | 75 | 11 | 1.6 | 109 | 125 |
| Example 4 | II-6 (25) | 0.32 | 75 | 12 | 2.0 | 109 | 124 |
| Example 5 | II-7 (25) | 0.29 | 75 | 12 | 1.6 | 109 | 124 |
| Example 6 | II-8 (25) | 0.12 | 75 | 9 | 1.2 | 110 | 125 |
| Comparative Example 4 | II-9 (25) | 0.07 | 75 | 4 | 2.1 | 110 | 124 |
| Comparative Example 5 | II-10 (25) | 0.08 | 75 | 5 | 2.1 | 109 | 125 |
| Comparative Example 6 | II-11 (25) | 0.07 | 75 | 5 | 2.1 | 110 | 125 |

TABLE 6

| | Amount of graft copolymer [II-1] (parts) | Amount of rigid thermoplastic resin (parts) | | | Izod impact strength (kg · cm/cm) | | | MI (g) | R | VST (°C.) |
|---|---|---|---|---|---|---|---|---|---|---|
| | | III-a | III-b | III-c | At 23° C. | At −30° C. | After accelerated exposure at 23° C. | | | |
| Example 7 | 25 | — | 75 | — | 9 | 3 | 7 | 1.0 | 111 | 128 |
| Example 8 | 25 | 45 | — | 30 | 14 | 4 | 10 | 3.2 | 108 | 109 |
| Example 9 | 25 | — | 45 | 30 | 12 | 3 | 7 | 2.6 | 109 | 112 |

We claim:

1. An impact-resistant thermoplastic resin composition comprising (a) a graft copolymer (II) prepared by polymerizing 10 to 1,000 parts by weight of a monomer or monomer mixture composed of 50 to 100% by weight of a monomer selected from the group consisting of methyl methacrylate and styrene and 50 to 0% by weight of a monofunctional or polyfunctional monomer copolymerizable therewith in the presence of 100 parts by weight (as solids) of a latex of an agglomerated rubber copolymer (I'), and (b) a heat-resistant rigid thermoplastic resin (III) comprising a member selected from the group consisting of a copolymer derived from 10 to 40% by weight of acrylonitrile, 90 to 60% by weight of α-methylstyrene, and 30 to 0% by weight of another monomer copolymerizable therewith and a copolymer derived from 5 to 40% by weight of a maleimide compound, 10 to 40% by weight of acrylonitrile, 85 to 30% by weight of at least one monomer selected from the group consisting of styrene and α-methylstyrene, and 30 to 0% by weight of another monomer copolymerizable therewith; the proportion of the graft copolymer (II) to the rigid thermoplastic resin (III) being such that the amount of the agglomerated rubber copolymer (I') is 1 to 70% by weight based on the total weight of the impact-resistant thermoplastic resin composition;

said agglomerated rubber copolymer (I') being prepared by the steps of:

emulsion-polymerizing a monomer mixture comprised of 51 to 99% by weight of an alkyl acrylate having 2 to 8 carbon atoms in the alkyl group, 49 to 1% by weight of 1,3-butadiene, and 10 to 0% by weight of at least one copolymerizable monomer selected from the group consisting of monofunctional monomers and polyfunctional monomers, to prepare a latex of a rubbery copolymer (I), and agglomerating the rubbery copolymer (I) to an extent such that the average particle diameter of the agglomerated rubbery copolymer is 0.12 to 0.4 μm, by adding 0.1 to 5 parts by weight of an agglomerating agent to 100 parts by weight as solids of the latex of the rubbery copolymer (I); said agglomerating agent being selected from the group consisting of (A) an acid group-containing copolymer in a polymer latex formed by emulsion-polymerizing a monomer mixture comprised of 3 to 40% by weight of at least one unsaturated acid selected from the group consisting of acrylic acid, methacrylic acid, itaconic acid, crotonic acid, maleic acid, fumaric acid, cinnamic acid, sorbic acid and p-styrenesulfonic acid, 97 to 35% by weight of at least one alkyl acrylate having 1 to 12 carbon atoms in the alkyl group and 0 to 40% by weight of other monomer copolymerizable therewith.

2. The resin composition according to claim 1 wherein the monomer mixture used for the preparation of a latex of the rubbery copolymer (I) is comprised of 51 to 65% by weight of an alkyl acrylate having 2 to 8 carbon atoms in the alkyl group, 49 to 35% by weight of 1,3-butadiene, and 0 to 5% by weight of another monofunctional or polyfunctional monomer.

3. The resin composition according to claim 1 wherein the rubbery copolymer (I) has a particle diameter of 0.03 to 0.20 μm.

4. The resin composition according to claim 1 wherein the rubbery copolymer (I) has a particle diameter of 0.05 to 0.15 μm.

5. The resin composition according to claim 1 wherein the amount of the acid group-containing copolymer (A) used as an agglomerating agent is 0.5 to 5 parts by weight based on 100 parts by weight as solids of the latex of the rubbery copolymer (I).

6. The resin composition according to claim 1 wherein the monomer or monomer mixture to be polymerized for the preparation of the graft copolymer (II) is selected from the group consisting of styrene alone, methyl methacrylate alone, a styrene/acrylonitrile monomer mixture, a styrene/acrylic acid ester monomer mixture, a methyl methacrylate/acrylonitrile monomer mixture, and a methyl methacrylate/acrylic acid ester monomer mixture.

7. The resin composition according to claim 1 wherein the proportion of the graft copolymer (II) to the rigid thermoplastic resin (III) is such that the amount of the agglomerated rubber copolymer (I') is 5 to 40% by weight based on the total weight of the impact-resistant thermoplastic resin composition.

* * * * *